United States Patent
Surendran et al.

(10) Patent No.: US 9,986,018 B2
(45) Date of Patent: May 29, 2018

(54) METHOD AND SYSTEM FOR A SCHEDULED MAP EXECUTOR

(71) Applicant: Yahoo! Inc., Sunnyvale, CA (US)

(72) Inventors: Ajitsen Surendran, Karnataka (IN); Satyadeep Sridharan Musuvathy, Karnataka (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 634 days.

(21) Appl. No.: 14/151,277

(22) Filed: Jan. 9, 2014

(65) Prior Publication Data

US 2015/0195344 A1    Jul. 9, 2015

(51) Int. Cl.
*H04L 29/08* (2006.01)
*G06F 9/50* (2006.01)

(52) U.S. Cl.
CPC ............ *H04L 67/10* (2013.01); *G06F 9/5066* (2013.01); *H04L 67/32* (2013.01)

(58) Field of Classification Search
CPC .......... H04L 67/10; H04L 67/32; G06F 9/466
USPC ........................................................ 709/201
See application file for complete search history.

(56) References Cited

U.S. PATENT DOCUMENTS

| | | | |
|---|---|---|---|
| 5,881,227 A | 3/1999 | Brenner et al. | |
| 7,418,470 B2 | 8/2008 | Howard et al. | |
| 7,487,206 B2 | 2/2009 | Gu et al. | |
| 7,506,020 B2 | 3/2009 | Ellis | |
| 7,774,440 B1 | 8/2010 | Bagrodia et al. | |
| 8,489,668 B2 | 7/2013 | Huff et al. | |
| 8,510,366 B1 | 8/2013 | Anderson et al. | |
| 2005/0080916 A1 | 4/2005 | Katayama | |
| 2005/0246547 A1 | 11/2005 | Oswald et al. | |
| 2007/0046821 A1 | 3/2007 | Mead | |
| 2007/0279667 A1 | 12/2007 | Hattori et al. | |
| 2008/0313011 A1 | 12/2008 | Rose | |
| 2009/0125563 A1* | 5/2009 | Wong | G06F 17/30566 |
| 2011/0010674 A1 | 1/2011 | Knize | |
| 2012/0200580 A1* | 8/2012 | Gnanasambandam | G06T 1/20 345/505 |
| 2012/0297238 A1 | 11/2012 | Watson | |
| 2012/0314653 A1* | 12/2012 | Liu | H04W 28/065 370/328 |
| 2013/0104177 A1 | 4/2013 | Kwan | |

(Continued)

OTHER PUBLICATIONS

Office Action dated Apr. 8, 2016 in U.S. Appl. No. 14/109,169.

(Continued)

*Primary Examiner* — Vivek Srivastava
*Assistant Examiner* — Sibte Bukhari
(74) *Attorney, Agent, or Firm* — Pillsbury Winthrop Shaw Pittman LLP

(57) ABSTRACT

Method, system, and programs for data processing. In one example, a record is received. The record is separated into multiple partitions. Each partition is submitted to an iterative pipeline, wherein the iterative pipeline comprises two or more processing stages that are run in parallel and one of the multiple partitions passes through one of the two or more processing stages in one iteration. The multiple partitions are passed through two or more processing stages. The partitions that have passed through each of the two or more processing stages are merged.

20 Claims, 10 Drawing Sheets

(56) References Cited

U.S. PATENT DOCUMENTS

2013/0111484 A1* 5/2013 Chen .................. G06F 11/0757
                                              718/102
2013/0212603 A1   8/2013 Cooke
2015/0071346 A1   3/2015 Ronca

OTHER PUBLICATIONS

Office Action dated Jan. 5, 2015 in U.S. Appl. No. 14/109,169.
Office Action dated Jul. 16, 2015 in U.S. Appl. No. 14/109,169.
Office Action dated Jan. 26, 2017 in U.S. Appl. No. 14/109,169.
Office Action dated Feb. 22, 2018 in U.S. Appl. No. 14/106,169.

* cited by examiner

Figure: Scheduler thread enqueues at fixed rate

Figure: exemplar cloud computing architecture

METHOD AND SYSTEM FOR A SCHEDULED MAP EXECUTOR

BACKGROUND

1. Technical Field

The present teaching relates to methods and systems for data processing. Particularly, the present teaching is directed to methods, systems, and programming to maximize throughput of processing jobs.

2. Discussion of Technical Background

The advancement of the Internet has made it possible to make a tremendous amount of information accessible to users located anywhere in the world. It is estimated that hundreds of exabytes of information is stored in digital form. Content providers, such as businesses, government agencies, and individuals, generate large amounts of both structured and unstructured data which, in order to be accessible online, must be processed, analyzed, and stored. With the explosion of information, new issues have arisen. First, much effort has been put into organizing the vast amount of information to facilitate the search for information in a more effective and systematic manner. Due to the large volume of content that is presently available and is continually generated, traditional data computing techniques are inadequate to facilitate processing large volumes of data that may be terabytes or petabytes in size.

A number of large scale data processing and analysis tools have been developed to process large volumes of information. Many of these tools make use of cloud computing, which involves a number of computers connected through a real-time communication network, such as the Internet. Cloud computing allows computational jobs to be distributed over a network and allows a program to be concurrently run on many connected computers. The network resources may be shared by multiple users or may be dynamically re-allocated to accommodate network demand. As such, cloud computing solutions are often designed to maximize the computing power of the network and the efficiency of the network devices. This distributed processing configuration allows an entity to avoid upfront infrastructure costs associated with computing equipment.

Apache Hadoop (Highly Available Distributed Object Oriented Platform) is a Java-based programming framework and one of the most popular large scale data processing and analysis tools presently available. Hadoop Distributed File System, is a distributed file system designed to hold terabytes or even petabytes of data and provide high-throughput access to this information. Files are stored in a redundant fashion across multiple machines to ensure their durability to failure and high availability to very parallel applications. Google's MapReduce is another programming model for processing large scale data sets that makes use of a parallel, distributed algorithm. Hadoop is an open source implementation of the MapReduce platform and distributed file system.

Existing large scale data processing and analysis tools offer users scalable, reliable services that are easy to use. For example, Yahoo! offers its users a large scale partner feed processing system that interfaces with various hosted services for enrichment of partner feeds. These hosted services typically provision a limited quota of its resources to a new user during on-boarding and the number of machines involved depends on input size and cluster size. However, present technologies, including cloud services, may be overloaded by large-scale processing jobs. There is a need adequately control and maximize throughput of network intensive processing jobs.

There is presently no solution which makes adequate use of increasing throughput of processing jobs by concurrent utilization of multiple network resources. Within a large scale data processing platform, processing data from partner feeds relies heavily on resources provided by cloud based systems. Not only do cloud based systems provide necessary storage, but the systems may enrich processed data with, by way of example, geographic information, context analysis, or license management information. Processing tasks are provisioned among resources available on the network. In many cloud based systems, the allocation of resources to a particular user or job is done based, in part, on peak usage. For example, in case of Hadoop-based feed processing, peak usage is determined by input feed size. However, one drawback to provisioning is the high cost associated with the necessary dedicated hardware. In addition, the sequential processing of data by multiple services in existing data processing systems is inherently limited in that only one service at a time may be utilized. For example, while running a processing stage for enriching data, it is not possible to utilize services upload data to an ingestion buffer or content grid. In addition, large input size will cause existing data processing systems to generate a large number of map tasks, which can overload the entire system.

Although cloud based systems allow for large scale data processing to be distributed across multiple machines in a network, cloud services are largely underutilized when provisioned for daily peak capacity. By way of example, a client may overload cloud services beyond the allocated quota, resulting in underperformance or outage of the services. Overload poses a systemic risk to cloud services and there has been significant investment in overload protection for these services. Although resource intensive processing jobs pose serious risk of system overload, processing systems may remain largely unused the majority of the time they are online. For example, a batch processing system may be utilized for a period of less than three hours per day at an image upload rate of 360 uploads per second, yet the cloud provisioning done to handle this rate of request could remain unused for rest of the day. One option to reduce the amount of network resources required would involve limiting the rate at which upload requests are made such that the system is utilized for a longer time period. However, no existing solutions provides achieve this goal without adjusting or otherwise relying on input feed size.

The use large scale data processing platforms to process network intensive jobs poses a number of challenges. For example, these solutions may over provision the cloud service, due to scalability issues. By way of further example, a drastic increase in data input size could cause overload on the service, resulting in slowed performance speeds or outages. In addition, processing network intensive jobs may result in considerable waste of cluster capacity as the rate of processing will be limited by the network service. These factors, among others, affect the overall throughput and number of records processed per second by the platform. As many large scale data processing platforms are not optimized for such processing, a solution is needed that would allow existing platforms to perform network intensive processing jobs.

In addition, a solution is needed that would control the rate at which requests are made to particular processing services, while maximizing overall throughput. Existing solutions for controlling request rates to achieve high throughput include establishing a set number of reduce nodes and performing all network operations in a single reduce phase. However, existing reduce based solutions suffer from several drawbacks. For example, in the event that a web service does not accept batch requests, reduce based solutions must to allocate large number of reduce nodes, each of which must wait until all map tasks have been completed, resulting in underutilization of grid nodes. Further, reduce based solutions require additional data transfer from Map Nodes to Reduce Nodes. Existing solutions may also require overload protection services and implement error handling, such as exponential back-off in map process, resulting in inefficiency and high cost throughput.

SUMMARY

The present teaching relates to methods and systems for data processing. Particularly, the present teaching is directed to methods, systems, and programming for processing data using an iterative pipelining approach.

In an embodiment, a method, implemented on at least one computing device having at least one processor, storage, and a communication platform connected to a network for retrieving content on a network, such as the World Wide Web, is disclosed. In this embodiment, a queue of one or more records for processing is generated. A rate at which the one or more records are requested for processing is set. One or more records listed on the queue are retrieved. The retrieved record or records are submitted to a proxy record reader. The records submitted to the proxy record reader are removed from the queue. The retrieve record or records are submitted to an actual record reader.

In another embodiment, a system for implementing a computer implemented method is disclosed. In one embodiment, a system for implementing a computer implemented method comprises a map task that further comprises a scheduled input format class and a proxy record reader class. In another embodiment, a system for implementing a computer implemented method comprises a proxy input format class, a proxy record reader class, and a scheduler class which controls the rate at which map tasks are performed.

This embodiment comprises additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to processing electronic information. In one embodiment, a queue of one or more records for processing is generated. A rate at which the one or more records are requested for processing is set. One or more records listed on the queue are retrieved. The retrieved record or records are submitted to a proxy record reader. The records submitted to the proxy record reader are removed from the queue. The retrieve record or records are submitted to an actual record reader.

Figure 1:
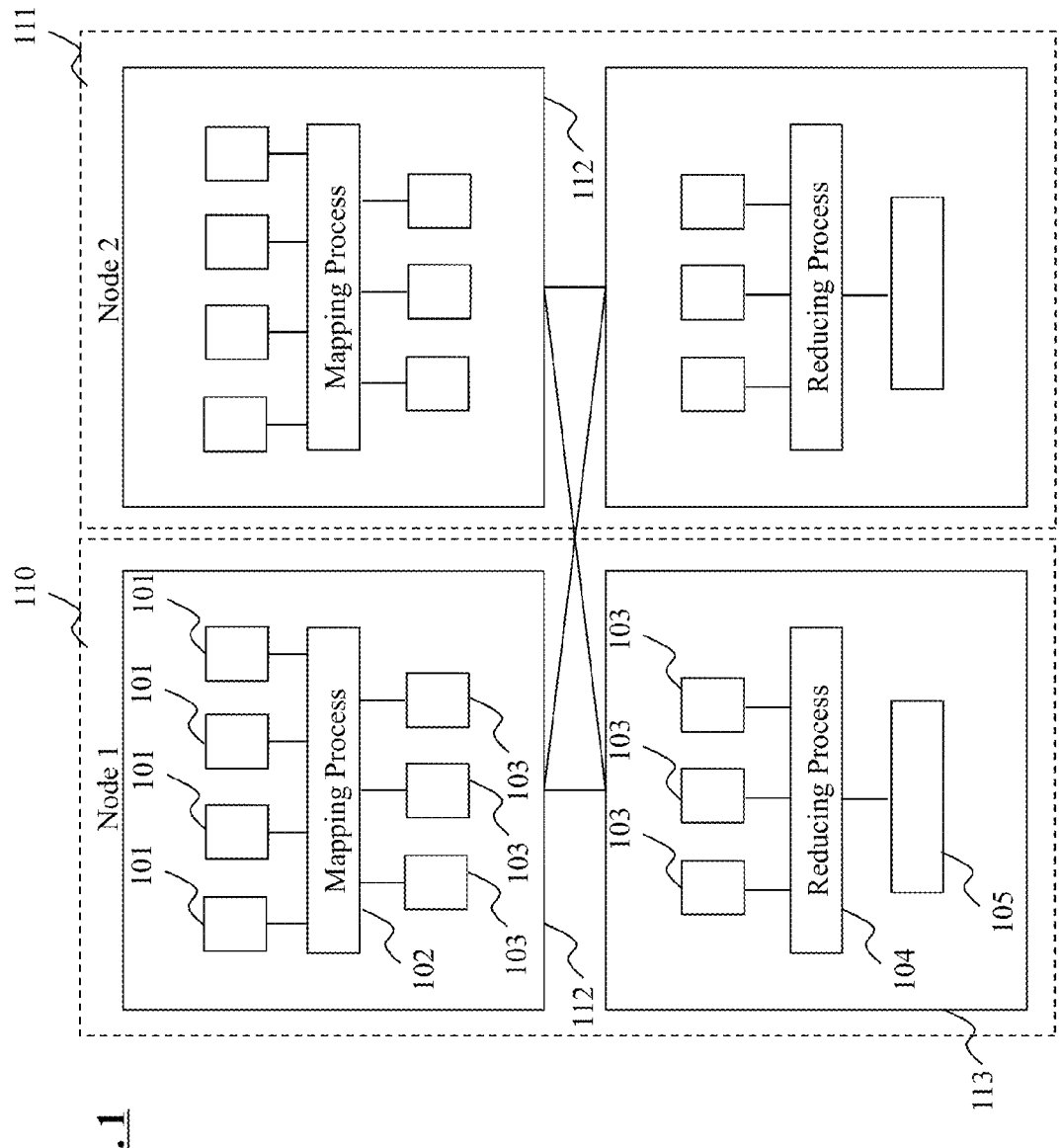
FIG. 1 depicts a high-level overview of a MapReduce pipeline.

Whereas the present teaching may be implemented in nearly any platform for large scale data processing, one embodiment of the present teaching is implemented by the Hadoop batch processing system, which is an open source implementation of the MapReduce platform and distributed file system. An example of a high level diagram of a MapReduce pipeline is depicted in FIG. 1. MapReduce is a programming model designed for processing large volumes of data by dividing the project into multiple, independent tasks. The first phase of a typical MapReduce program is known as mapping, which creates an output list by applying a function to individual elements of an input list. The second phase of a typical MapReduce program is known as reducing, which provides the ability to aggregate multiple input values to produce an aggregate value as an output. Reducing is commonly used to generate summary data by converting a large volume of data into a smaller summary of the data, such as a sum of a list of input values. Hadoop utilizes a MapReduce framework with two main components: one that implements a mapping function 102 and the other that implements a reducing function 104. Input files 101 are loaded onto a processing cluster and distributed across nodes 110, 111. Whereas FIG. 1 depicts two nodes 110, 111, a system may contain any number of nodes. During the mapping phase 112, input files 101 are submitted to the mapping process 102 and intermediate data 103 is output. After the mapping phase 112 has finished, the intermediate data 103 is exchanged between all machines or processing elements in each node 110, 111 and the reduce tasks are spread across the same notes in the cluster as the mapping processes. The intermediate data 103 is then sent to the reducing phase 113 where it is subject to a reducing process 104 that generates the outputs 105 of the reduce phase.

Figure 2:
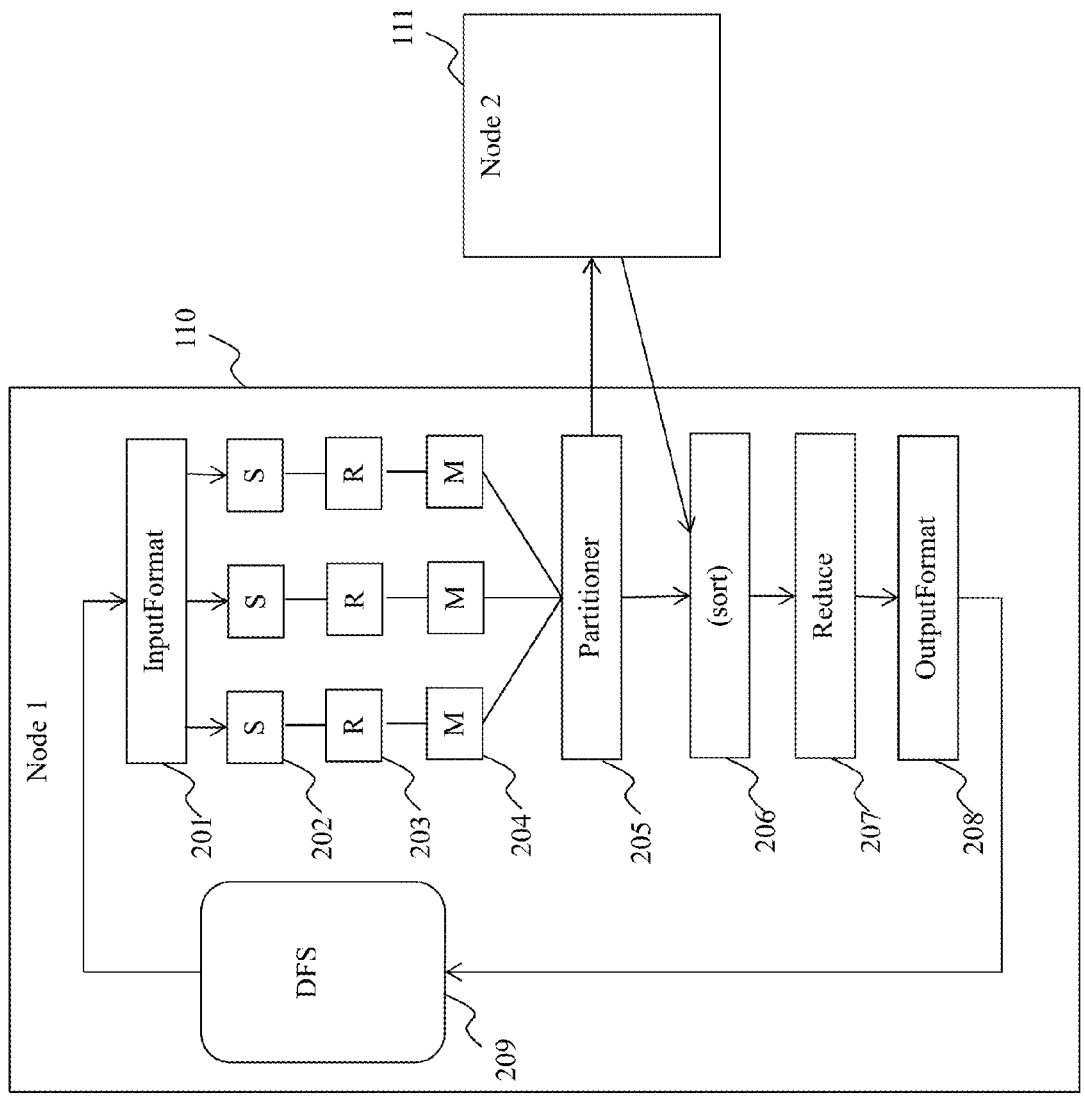
FIG. 2 depicts a typical MapReduce data flow.

A more detailed example of data flow in a typical MapReduce that may be implemented by one embodiment of the present teaching is depicted in FIG. 2. Within a node, 110, a program 201 partitions input files into logical byte-oriented splits 113 (identified in FIG. 2 with an "S"), each of which specify file name, offset, length and set of nodes that host most of the split. FIG. 2 identifies InputFormat 201 as the program in this example. For most systems, the total number of map tasks 204 (identified in FIG. 2 with an "M") is equal to the number of splits returned by InputFormat, which could be greater than the number of concurrently running map tasks 204. Record readers 203 (identified in FIG. 2 with an "R") read the splits and sequentially pass each record, one at a time, to the map task 204 as key value pairs. Often times, processing requires multiple map reduce jobs. In some circumstances, work flow language may allow users to stitch multiple map-reduce jobs together, wherein the work flow supports control nodes such as decision, fork, and join. A fork node splits one path of execution into multiple concurrent paths of execution. A join node waits until each concurrent execution path of a previous fork node arrives. The map tasks 204 perform the work of the first phase 112 of the MapReduce program. After the first map tasks 204 have completed in one node, other nodes may still be performing map tasks. Intermediate outputs are passed to a partitioner class 205, from which the nodes 110 and 111 begin exchanging the intermediate outputs from the map tasks to reducers, a process sometimes referred to as "shuffling". A different subset of the intermediate key space is assigned to each reduce node and serve as the inputs to the reduce tasks. Each map task may emit key-value pairs to any partition, wherein all values for the same key are reduced together, irrespective of its mapper of origin. Because the map nodes must all agree on where to send the different pieces of the intermediate data, the partitioner class 205 determines to which partition a given key-value pair will be sent. The set of intermediate keys on a single node is automatically sorted 206 before being passed to a reduce instance 207 where each reducer 207 instance is created for a reduce task. For each key in the partition assigned to a reducer 207, the reduce method is called once. The output files written by the reducers 207 are then stored in a distributed file system 209 for subsequent use by another map reduce job, separate program, other form of inspection, or further manipulation.

Figure 3:
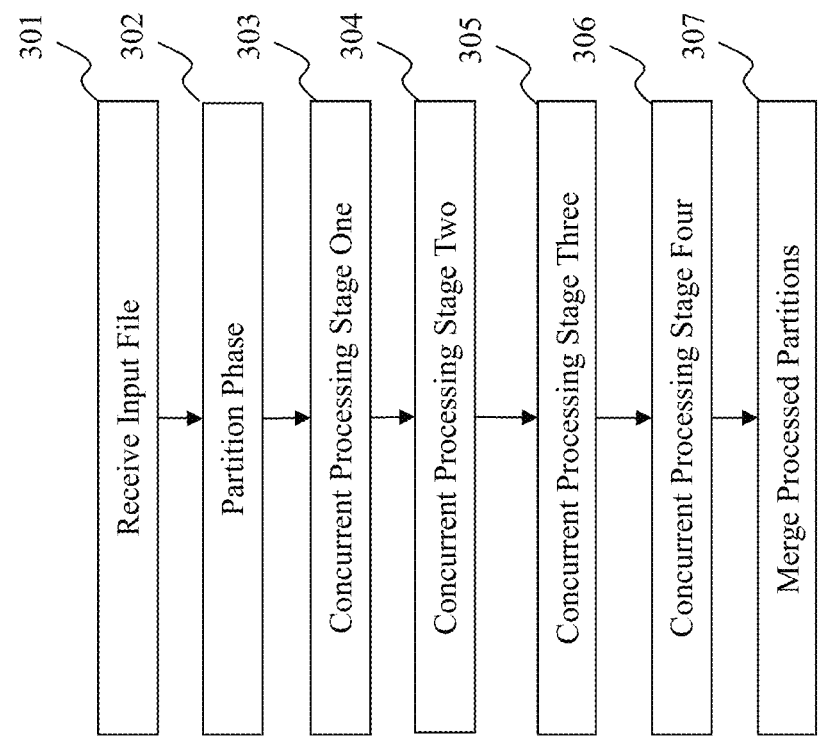
FIG. 3 depicts a data processing workflow according to an embodiment of the present teaching.

FIG. 3 depicts a data processing workflow according to an embodiment of the present teaching. In the first step of this embodiment, an input file is received 301. The input file may comprise data, feed files, other electronic files, information, or some other form of electronic record. The received input file proceeds to a partition phase, 302, which separates the input file into partitions or chunks of a configured size. In one embodiment, the size of the input file determines the number of map tasks to be performed. In one embodiment, the number of concurrent maps determine a request rate. The partitions are sequentially passed along to a concurrent processing stage one 303, a concurrent processing stage two 304, a concurrent processing stage three 305, and a concurrent processing stage four 306. Although four concurrent processing stages are depicted in FIG. 3, the number of concurrent processing stages will vary across embodiments of the present invention. In this embodiment, the workflow semantics of the system support iteration, such that one partition is passing through one of the concurrent processing stages as another partition is concurrently passing through a separate processing stage. After concurrent processing stage four 306, processed partitions are merged 307. In one embodiment, the processing stages are run concurrently and the workflow waits to complete all parallel stages before the processed partitions are merged.

Figure 4:
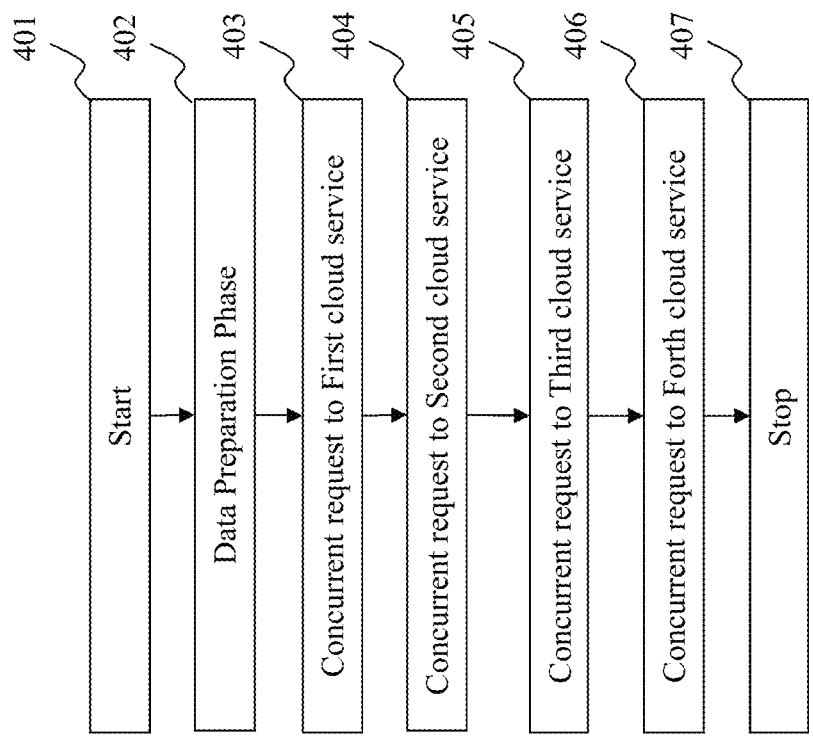
FIG. 4 depicts a bulk data processing workflow that depends on cloud services according to an embodiment of the present teaching.

FIG. 4 depicts a bulk data processing workflow that depends on cloud services according to an embodiment of the present teaching. In this embodiment the workflow is initiated with a start 401 command or request to process a given record or set of records. The one or more records then proceed to a data preparation phase 402 that performs preprocessing and prepares the one or more records for submission to a series of cloud services. In one embodiment, the one or more records are partitioned or separated into a number of smaller files, data sets, records, partitions, or other units. This may be done based, in total or in part, on the present or future capacity of the cloud services or the entire network. In one embodiment, a queue of records for processing is generated and a rate at which the one or more records appearing in the queue are processed is set. By way of example, this rate may be based on the size of the individual records, network capacity, and/or availability of processing services. Subsequently, requests are made to a series of cloud services 403, 404, 405, and 406 for processing the objects from the data preparation phase 402. The resulting objects are passed to the cloud services, which run concurrently and receive each object in sequence according to one embodiment of the present teaching. Although four concurrent processing stages are depicted in FIG. 4, the number of concurrent processing stages will vary across embodiments of the present invention. In one embodiment, the workflow semantics of the system support iteration, such that one object is passing through one of the could services as another partition is concurrently passing through a separate cloud service. In one embodiment, the cloud services 403, 404, 405, and 406 are configured to run as an iterative pipeline in which objects are concurrently processed by the cloud services in sequence. The workflow reaches a stop 407 once the record or each of its component objects has been processed by the cloud services.

Figure 5:
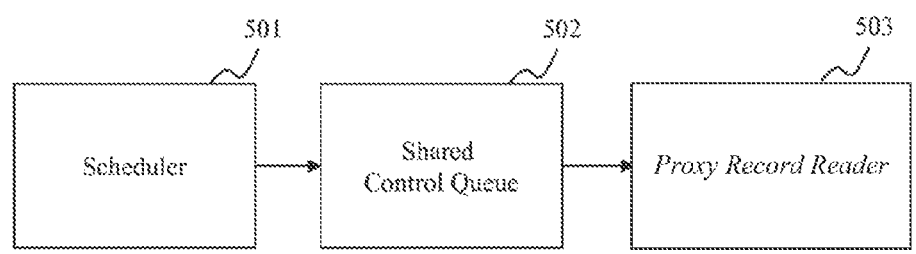
FIG. 5 depicts a workflow according to one embodiment of the present teaching.

In one embodiment, the present teaching is able to perform web service requests from a single map job and to further control the rate at which map tasks are executed. FIG. 5 depicts a workflow according to one embodiment of the present teaching. In this embodiment, a scheduler thread enqueues records at for processing at a fixed rate. The Scheduler 501 adds records to a Shared Control Queue 502. The records are then passed from the Shared Control Queue 502 to a Proxy Record Reader 503. The present teaching provides a set of reusable classes to control and maximize throughput of network intensive jobs. In one embodiment, the present teaching controls a request rate by limiting input size and limiting the rate of execution of a map task.

Figure 6:
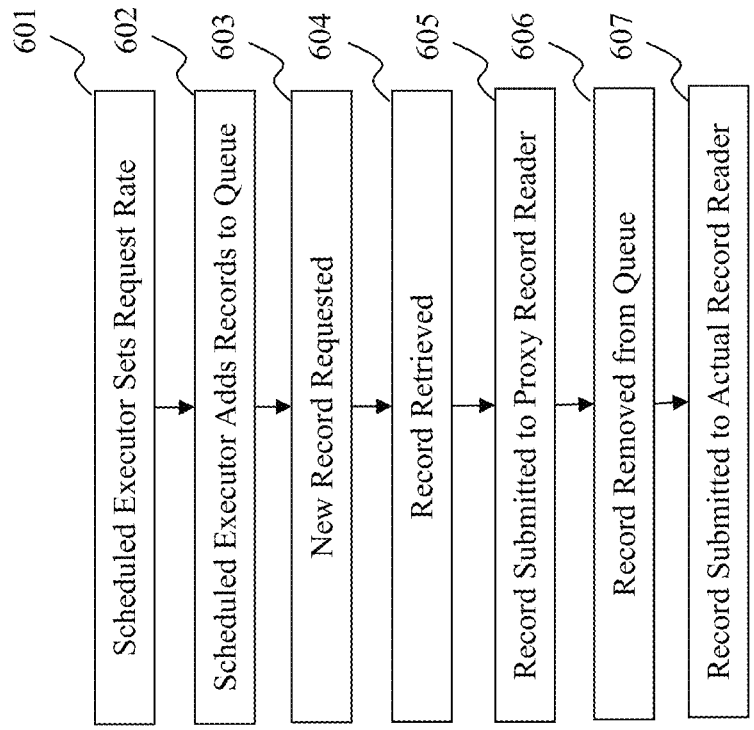
FIG. 6 depicts an execution sequence to read a record according to one embodiment of the present invention.

FIG. 6 depicts an execution sequence to read a record according to one embodiment of the present invention. In this embodiment, a scheduled executor sets a rate at which records are requested for processing 601. The scheduled executor then adds the records to a queue 602. Once the queue of records for processing has been at least partially populated, a new record listed in the queue is requested 603. The requested record is retrieved 604 and submitted to a proxy record reader 605. Once the record has been submitted to a proxy record reader according to this embodiment of the present teaching, the record is removed from the queue 606. The record is then submitted to an actual record reader for processing 607.

Figure 7:
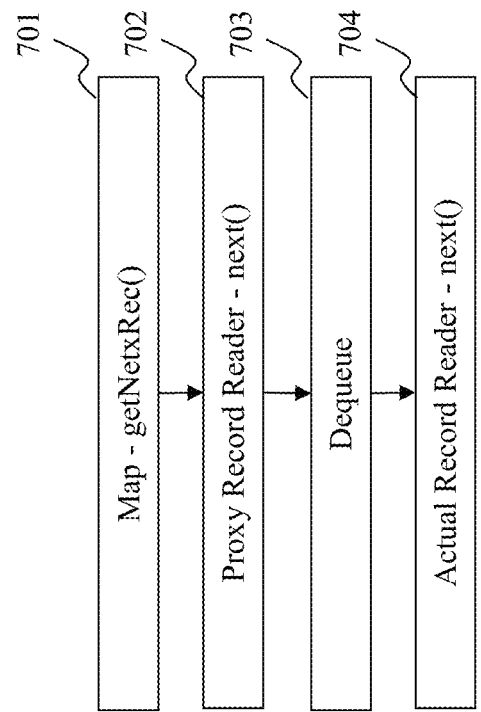
FIG. 7 depicts an execution sequence to read a record according to one embodiment of the present invention.

FIG. 7 depicts another execution sequence to read a record according to one embodiment of the present invention. In this embodiment, the scheduler may be run as an independent thread per map task. The map task includes a function that retrieves a next record in a queue 701. The record is passed to the Proxy Record Reader 702 and is removed from the queue 703. The record is then passed to the Actual Record Reader 704.

One embodiment of the present teaching seeks to execute scheduled map tasks using a number of separate classes. In one embodiment, the present teaching includes three reusable classes: a proxy input format, a proxy record reader, and a scheduler which controls the rate at which map tasks are performed. The present teaching is configurable to limit the maximum rate at which map tasks can execute and is capable of achieving continuous utilization of different network resources by submitting requests directed to individual services from a single map stage. In one embodiment, the present teaching utilizes the Chained Mapper construct provided by Hadoop. The present teaching may also rely on Fair Scheduler's maxMaps to limit the number of concurrent map jobs performed.

As described above, one embodiment of the present teaching includes three reusable classes: a proxy input format, a proxy record reader, and a scheduler which controls the rate at which map tasks are performed. In one embodiment, the scheduler class may be run as an independent thread per map task, such that the scheduler establishes a fixed or maximum rate at which map tasks execute and individual tasks are enqueued accordingly. In one embodiment, the present teaching performs an execution sequence to read a record each time a new record is requested or retrieved for processing. This sequence may include retrieval of a record, submission of the record to a proxy record reader, removal of the record from the queue of records for processing, and submission of the record to an actual record reader. In one embodiment, the record reader polls the queue for a control signal from the scheduler. In one embodiment, multiple map tasks may be chained and run as a single map task. In this embodiment, the output of a first mapper class becomes the input of a second subsequent class, and so on until the last mapper class at which point the final output is written as the task's output. In one embodiment, the record read passes through each mapper class in a chain before the main map task picks up next record.

In one embodiment, two classes are added to a map task: a scheduled input format class and a proxy record reader class. In this embodiment, the scheduler class is a thread started by the proxy record reader and implemented using concurrent.ScheduledExecutorService. The scheduler class runs and populates a shared control queue with control bytes until the queue is full at preconfigured rate. The queue is then emptied by a proxy record reader as each record is read and the number of concurrent maps is limited by a task scheduler, such as Hadoop's FairScheduler's maxMap. In one embodiment, the number of maps is limited by controlling the number of items returned in an array and by further partitioning or merging multiple logical splits to reduce or increase number of maps.

Figure 8:
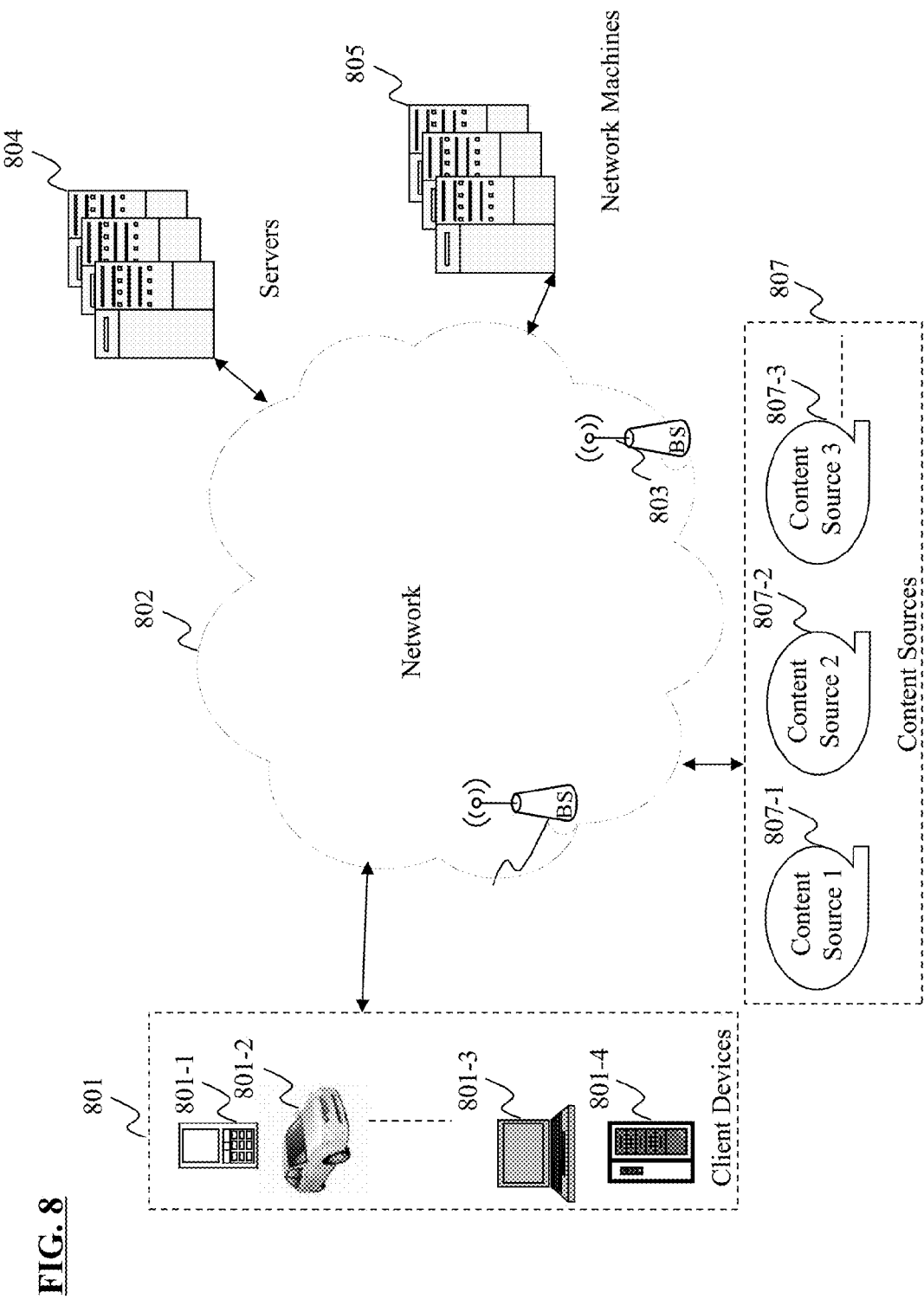
FIG. 8 depicts a general network architecture on which the present teaching can be implemented.

FIG. 8 is a high level depiction of an exemplary networked environment in which an exemplary embodiment of the present teaching may be implemented. The exemplary system includes client devices 801, a network 802, multiple servers 804, Network Machines 805, and Content Sources 807. The network 802 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 803, through which a data source may connect to the network in order to transmit information via the network. Client devices 801 may be of different types including those operated by users connected to the network via desktop connections (801-4), users connecting to the network via wireless connections such as through a laptop (801-3), a handheld device (801-1), or a built-in device in a motor vehicle (801-2). The content sources 807 may include multiple content sources 807-1, 807-2, ..., 807-3. A content source may correspond to a web page host or general data structure corresponding to an entity, whether an individual, a business, or an organization such as USPTO.gov, a content provider such as cnn.com and Yahoo.com, or a content feed source such as Twitter or blogs. The servers 804 may access information from any of the content sources 807-1, 807-2, ..., 807-3. The servers may access or provide information regarding existing objects, or to classify new or existing entities as objects within the system. The servers 804 may also direct requests, calls, initiate other tasks or receive information from the network machines 805, which may be used to perform clout services. The servers 804 may also access additional information, via the network 802, stored in the network, which may contain, e.g., structured information such as information about certain objects, identifiers assigned to objects, graphs of entities based on their content, events that link different objects together, etc.

Figure 9:
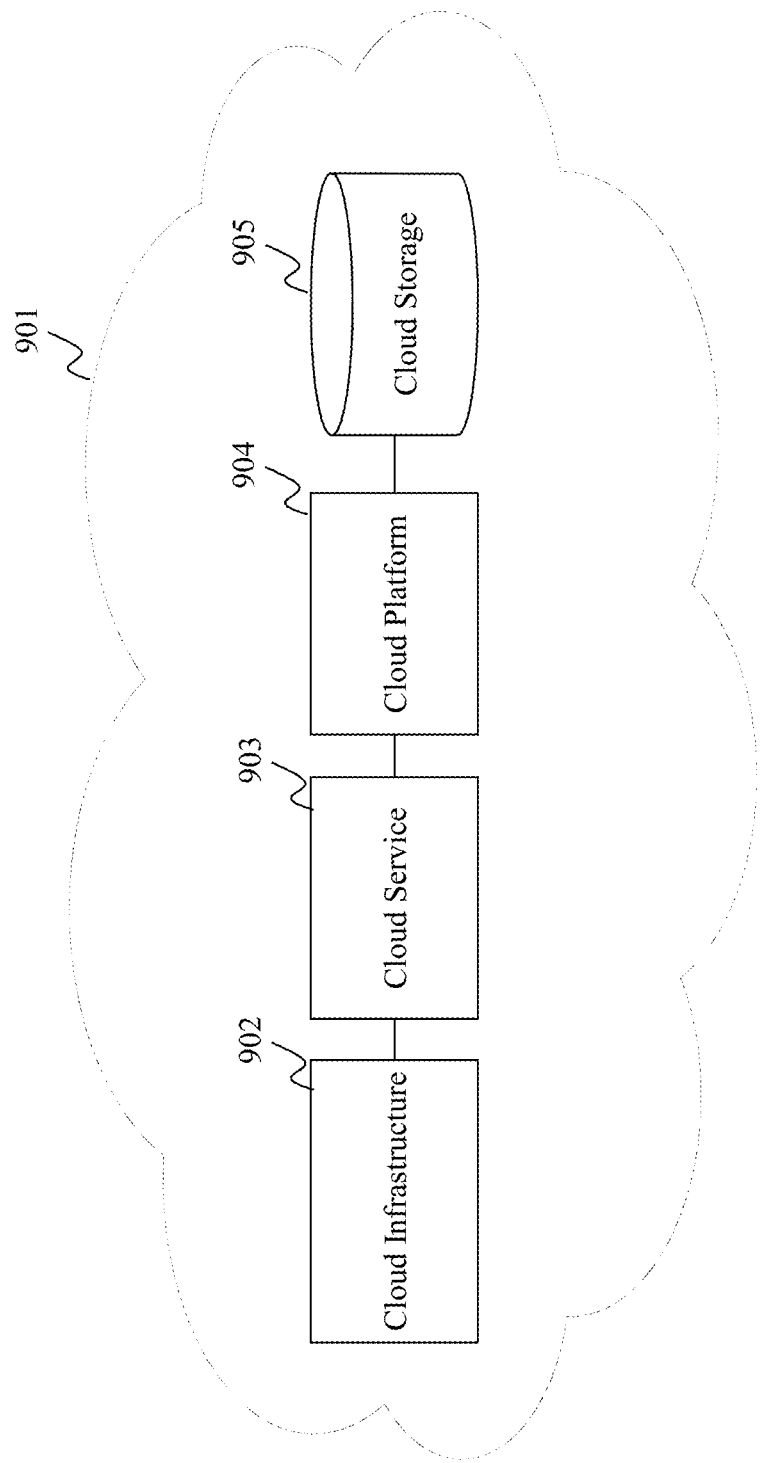
FIG. 9 depicts a general cloud computing architecture on which the present teaching can be implemented.

FIG. 9 depicts a general cloud computing architecture 901 on which embodiments of present teaching may be implemented. The cloud computing architecture may include a Cloud Infrastructure 902, a Cloud Service 903, a Cloud Platform 904, and Cloud Storage 905. The cloud components may communicated with one another directly through a message queue or other coupling mechanism.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 10:
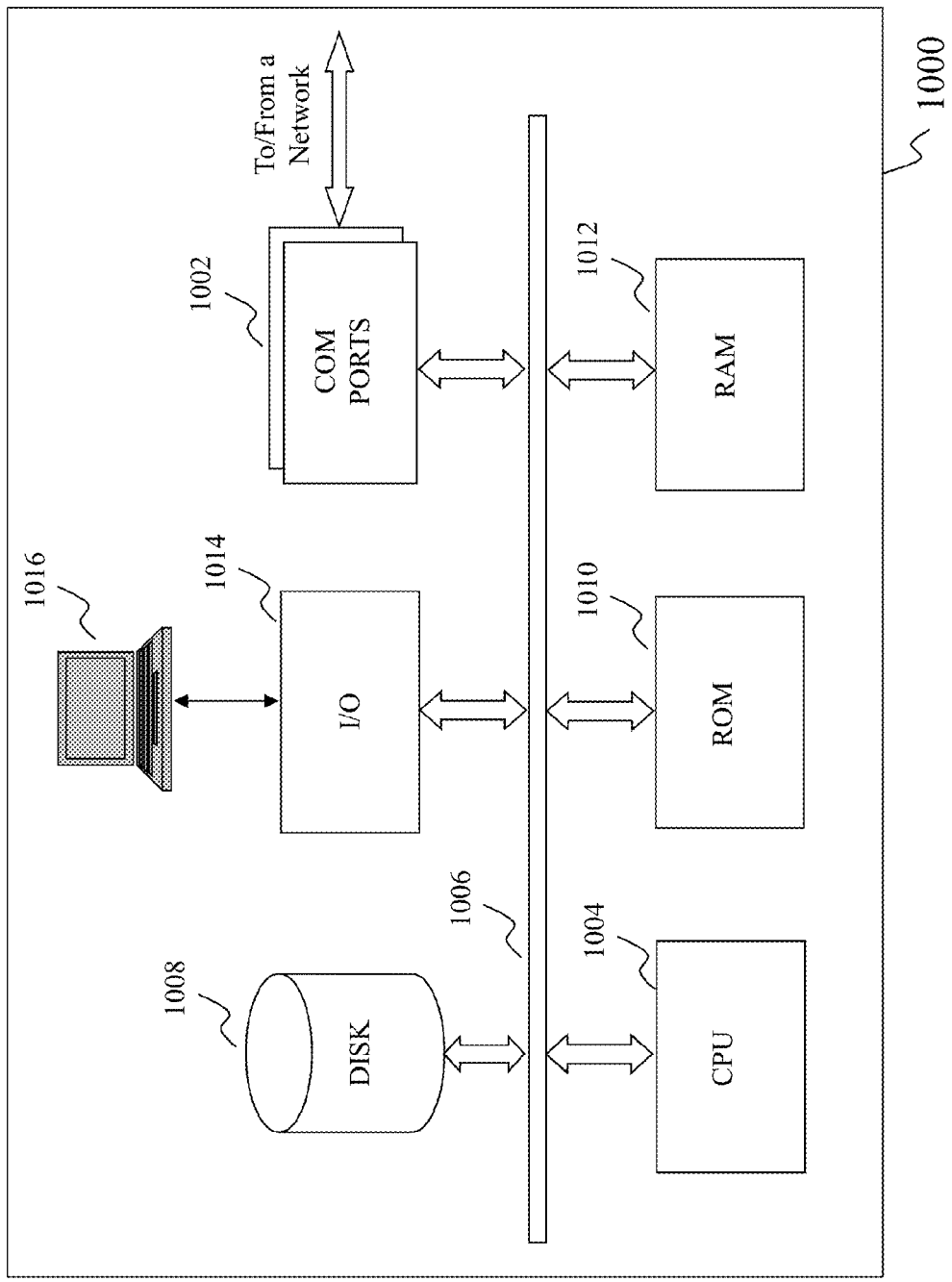
FIG. 10 depicts a general computer architecture on which the present teaching can be implemented.

FIG. 10 depicts a general computer architecture on which the present teaching can be implemented and has a functional block diagram illustration of a computer hardware platform that includes user interface elements. The computer may be a general-purpose computer or a special purpose computer. This computer 1000 can be used to implement any components of the user engagement measurement architecture as described herein. Different components of the system in the present teaching can all be implemented on one or more computers such as computer 1000, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1000, for example, includes COM ports 1002 connected to and from a network connected thereto to facilitate data communications. The computer 1000 also includes a central processing unit (CPU) 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU. The computer 1000 also includes an I/O component 1014, supporting input/output flows between the computer and other components therein such as user interface elements 1016. The computer 1000 may also receive programming and data via network communications.

Hence, aspects of the methods of processing data using an iterative pipeline, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which has at least one processor, storage, and a communication platform connected to a network for processing data, the method comprising:
    generating a queue of one or more records for processing;
    setting a rate at which the one or more records are requested for processing, wherein the rate is determined based on at least one of a network capacity and an availability of processing services;
    retrieving the one or more records listed on the queue;
    submitting the one or more records to a proxy record reader;
    removing the one or more records submitted to the proxy record reader from the queue; and
    submitting the one or more records to an actual record reader.

2. The method of claim 1, further comprising:
    polling the queue for a control signal, wherein the control signal is further used to set the rate at which the one or more records are requested for processing.

3. The method of claim 1, wherein the one or more record are separated into multiple partitions based on a capacity of a network application programming interface.

4. The method of claim 1, wherein the one or more records are separated into multiple partitions based on a capacity of one or more cloud services.

5. The method of claim 1, wherein a size of a record of the one or more records determines a number of map tasks to be performed on the one or more records.

6. The method of claim 1, wherein the rate is further determined based on a size of each record of the one or more records.

7. A system comprising a plurality of nodes, each of which has at least one processor configured for:
- generating a queue of one or more records for processing;
- setting a rate at which the one or more records are requested for processing, wherein the rate is determined based on at least one of a network capacity and an availability of processing services;
- retrieving the one or more records listed on the queue;
- submitting the one or more records to a proxy record reader;
- removing the one or more records submitted to the proxy record reader from the queue; and
- submitting the one or more records to an actual record reader.

8. The system of claim 7, wherein each node is further configured for:
- polling the queue for a control signal, wherein the control signal is further used to set the rate at which the one or more records are requested for processing.

9. The system of claim 7, wherein the one or more records are separated into multiple partitions based on a capacity of a network application programming interface.

10. The system of claim 7, wherein a record of the one or more records is separated into multiple partitions based on a capacity of one or more cloud services.

11. The system of claim 7, wherein a size of the record determines a number of map tasks to be performed on the one or more records.

12. The system of claim 7, wherein the rate is further determined based on a size of each record of the one or more records.

13. A non-transitory machine-readable medium having information recorded thereon for processing data, wherein the information, when read by the machine, causes the machine to perform the following:
- generating a queue of one or more records for processing;
- setting a rate at which the one or more records are requested for processing, wherein the rate is determined based on at least one of a network capacity and an availability of processing services;
- retrieving the one or more records listed on the queue;
- submitting the one or more records to a proxy record reader;
- removing the one or more records submitted to the proxy record reader from the queue; and
- submitting the one or more records to an actual record reader.

14. The medium of claim 13, further comprising:
- polling the queue for a control signal, wherein the control signal is further used to set the rate at which the one or more records are requested for processing.

15. The medium of claim 13, wherein the one or more records are separated into multiple partitions based on a capacity of a network application programming interface.

16. The medium of claim 13, wherein a record of the one or more records is separated into multiple partitions based on a capacity of one or more cloud services.

17. The medium of claim 13, wherein a size of a record of the one or more records determines a number of map tasks to be performed on the one or more records.

18. The medium of claim 13, wherein the rate is further determined based on a size of each record of the one or more records.

19. The method of claim 1, further comprising:
- receiving at least a first input file;
- separating the first input file into partitions;
- determining an input file size of the first input file; and
- determining a number of map tasks to be performed based on the input file size, wherein the rate is further determined based on the number.

20. The system of claim 7, wherein each of the at least one processor is further configured for:
- receiving at least a first input file;
- separating the first input file into partitions;
- determining an input file size of the first input file; and
- determining a number of map tasks to be performed based on the input file size, wherein the rate is further determined based on the number.

* * * * *